United States Patent
Shah et al.

(10) Patent No.: US 8,896,912 B2
(45) Date of Patent: Nov. 25, 2014

(54) CHIRPED QUASI PHASE-MATCHED OPTICAL PARAMETRIC AMPLIFIER/DIFFERENCE FREQUENCY GENERATOR (CQPM OPA/DFG)-BASED OPTICAL TUNING METHOD, APPARATUS, AND APPLICATIONS

(71) Applicant: University of Central Florida Research Foundation, Inc., Orlando, FL (US)

(72) Inventors: Lawrence Shah, Maitland, FL (US); Martin C. Richardson, Geneva, FL (US); Konstantin Vodopyanov, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 14/199,452

(22) Filed: Mar. 6, 2014

(65) Prior Publication Data
US 2014/0254618 A1 Sep. 11, 2014

Related U.S. Application Data

(60) Provisional application No. 61/774,884, filed on Mar. 8, 2013.

(51) Int. Cl.
*G02F 1/39* (2006.01)
*H01S 3/10* (2006.01)

(52) U.S. Cl.
CPC ................................. *H01S 3/10038* (2013.01)
USPC ........................................... 359/330; 372/20

(58) Field of Classification Search
CPC ................ G02F 1/39; G02F 2001/392; G02F 2001/3548; G02F 2201/16; H01S 3/10038
USPC ..................................... 359/326–332; 372/20
See application file for complete search history.

(56) References Cited

U.S. PATENT DOCUMENTS

| 6,208,458 | B1 * | 3/2001 | Galvanauskas et al. | 359/345 |
| 7,688,499 | B2 * | 3/2010 | Fermann et al. | 359/337.5 |
| 8,023,538 | B2 * | 9/2011 | Marcinkevicius et al. | 372/25 |

* cited by examiner

*Primary Examiner* — Daniel Petkovsek
(74) *Attorney, Agent, or Firm* — William Greener; Alek Szecsy; Bond, Schoeneck & King, PLLC

(57) ABSTRACT

A method for wavelength tunable output from a broadband spectrum using a quasi phase-matched optical parametric amplifier/difference frequency generator (CQPM OPA/DFG)-based apparatus involves changing the relative timing of a pump pulse with respect to a seed pulse. The temporal variation varies the location of the spatial/temporal overlap of the spectrally narrow pump pulse over the spectrally broad seed spectrum occurring within the CQPM nonlinear medium. This overlap position determines the portion of the seed pulse that is phase-matched as the signal in the OPA or the seed for DFG. Piezo-electric fiber stretchers may be employed to vary the relative pulse timing and enables tuning of the output from the OPA or DFG without the use of any moving parts. Associated apparatus is disclosed.

44 Claims, 3 Drawing Sheets

CHIRPED QUASI PHASE-MATCHED OPTICAL PARAMETRIC AMPLIFIER/DIFFERENCE FREQUENCY GENERATOR (CQPM OPA/DFG)-BASED OPTICAL TUNING METHOD, APPARATUS, AND APPLICATIONS

RELATED APPLICATION DATA

The instant application claims priority to U.S. provisional application Ser. No. 61/774,884 filed Mar. 8, 2013, the subject matter of which is incorporated herein by reference in its entirety.

GOVERNMENT SPONSORSHIP

Research funding was provided by the Office of Naval Research (ONR) under contract No. N000141210144. The U.S. government has certain rights in the invention.

BACKGROUND

1. Field of the Invention

Aspects and embodiments of the invention are directed generally to the field of optical apparatus, methods, and applications thereof; more particularly, to chirped quasi phase-matched optical parametric amplifier/difference frequency generator (CQPM OPA/DFG)-based optical tuning methods, apparatus, and applications; and, most particularly to such methods and apparatus enabling rapid, non-mechanical wavelength tuning over a broad or ultra-broad laser output spectrum.

2. Related Art

Many applications involving lasers, including but not limited to optical countermeasures, spectroscopy, hyperspectral imaging, and ultrashort pulse generation and amplification are or would be critically enhanced by lasers capable of broad and rapid spectral tunability in the mid-IR (or other spectra), high spectral intensity, and/or high average power. These lasers would provide still further enhancement by being miniaturized, monolithic, all fiber or solid-state, compact, efficient, robust, and manufacturable from readily/commercially available components.

Northrop Grumman's Viper™ is a small, lightweight multi-band laser for infrared countermeasures (IRCM) applications. All Viper components, including all wavelength conversion and beam-forming optics, controller, and power supply fit in a 13-inch diameter by 2-inch high chassis, weighing less than 10 pounds making it currently the lightest laser available for IRCM applications.

The inventors have recognized that methods and apparatus providing the features and enhancements referred to herein above would be particularly advantageous and beneficial in the art. They have further recognized that especial advantages and benefits would accrue from methods and apparatus that provide relatively faster wavelength tuning over a broad spectrum enabled by non-mechanical wavelength tuning as provided by the embodied invention.

Definitions as Used Herein

The term 'non-mechanical' or 'non-mechanically' as used in conjunction with embodied apparatus or methods for varying the timing between a pump pulse and a seed pulse for generating a wavelength tunable output from a chirped quasi-phase-matched (CQPM) nonlinear medium means 'without physically changing the alignment of the beams or the position, alignment and/or temperature of the CQPM nonlinear medium.' The term 'non-mechanical' or 'non-mechanically' as used herein and in complement with the aforereferenced definition further refers to either a lack of free-space components or structure/function accomplished entirely with fiber-coupled optical-delay and phase modulators. Thus, a 'peizo-electric fiber stretcher' as may be used herein, whilst including a mechanical structure (e.g., fiber-wrapped drum or spool), would be fully understood to be 'non-mechanical.'

The terms 'greater than,' 'much greater than,' 'less than,' 'much less than,' and/or their well known symbols '>,' '>>,' '<,' '<<', for example, as in "$\tau_e \ll \tau_s$," are intended to encompass values that would be understood by a person skilled in the art; thus the absence of a quantitative value per se will not render the term or terms indefinite to a person skilled in the art.

The term 'about' means the amount of the specified quantity plus/minus a fractional amount (e.g., ±10%, ±9%, ±8%, ±7%, ±6%, ±5%, ±4%, ±3%, ±2%, ±1%, etc.) thereof that a person skilled in the art would recognize as typical and reasonable for that particular quantity or measurement; thus the absence of a quantitative value per se will not render the term or terms indefinite to a person skilled in the art.

The term 'substantially' means as close to or similar to the specified term being modified as a person skilled in the art would recognize as typical and reasonable; for e.g., within typical manufacturing and/or assembly tolerances, as opposed to being intentionally different by design and implementation; thus the absence of a quantitative value per se will not render the term or terms indefinite to a person skilled in the art.

The term 'sufficient' means an amount or value that enables the function to which it applies; thus, for example, the phrase "amplifying the pump pulse to a 'sufficient' peak power" in the absence of a quantitative value per se will not render the term indefinite to a person skilled in the art.

SUMMARY

A most general aspect of the invention is a method for generating a wavelength tunable output from a broadband spectrum using a chirped quasi phase-matched optical parametric amplifier/difference frequency generator (CQPM OPA/DFG)-based apparatus. The method involves changing the relative timing of a pump pulse with respect to a seed pulse, particularly in a non-mechanical way. This temporal variation varies the location of the spatial/temporal overlap of a spectrally narrow pump pulse over a spectrally broad or ultra-broad (e.g., an octave) seed spectrum occurring within the CQPM nonlinear medium. This overlap location determines the portion of the seed spectrum that is phase-matched as the signal in the OPA or the seed for DFG. In a particular, non-limiting embodiment, a piezo-electric fiber stretcher is used to vary the relative pump/seed pulse timing, which enables tuning of a signal and idler output from the OPA or DFG without the use of any moving parts (i.e., non-mechanically). Fiber-coupled optical amplitude and/or phase modulators could also be included in either the pump or signal channels in order to provide control over the optical duty cycles as well as provide fine pulse control. This lends itself to monolithic integration and robust packaging for use in demanding environments and applications. Such applications include but are not limited to optical countermeasures, spectroscopy, hyperspectral imaging, ultrashort pulse generation and amplification, and many others where broad and rapid spectral tunability is required in the mid-IR, particularly applications requiring high spectral intensity and/or high average power, and are applicable to all of the aspects and embodiments disclosed and claimed herein.

An embodiment of the invention is a method for tunable wavelength selection in a broadband laser output including the steps of generating a pump pulse having a fixed wavelength, a center optical frequency, and a pulse duration ($\lambda_p$, $\upsilon_p$, $\tau_p$) and propagating the pump pulse along a pump pulse optical path; generating a seed pulse having a wavelength, frequency, and pulse duration ($\lambda_s$, $\upsilon_s$, $\tau_s$) and propagating the seed pulse along a seed pulse optical path, wherein $\tau_p \ll \tau_s$; amplifying the pump pulse to a sufficient peak power; spectrally broadening and chirping the seed pulse to generate a chirped, seed pulse spectrum; collinearly combining the amplified pump pulse and the chirped, seed pulse spectrum, wherein the pump pulse optical path and the seed pulse optical path are matched up to the point of combination; inputting the collinearly combined amplified pump pulse and the chirped, seed pulse spectrum into a chirped quasi phase-matched optical parametric amplifier/difference frequency generator (CQPM OPA/DFG) including a CQPM non-linear medium having a length and a chirp period, wherein the chirped, seed pulse spectrum is substantially matched to the length and the chirp period of the CQPM non-linear medium; and non-mechanically adjusting a time delay between the pump pulse and the seed pulse to select a particular phase-matched spectral bandwidth overlap region between the amplified pump pulse and the chirped, seed pulse spectrum in the CQPM non-linear medium, thus providing a discrete, tunable output wavelength over the seed pulse spectrum. According to various exemplary, non-limiting embodiments, the method may include the following additional steps, features, limitations, and/or characteristics, alone or in combination:

wherein 1 ps$\leq \tau_p \leq$100 ps and 100 ps$\leq \tau_x \leq$1 ns;
further comprising amplifying the pump pulse to a peak power between 1-100 kW;
comprising generating the pump pulse and the seed pulse from a single oscillator;
    comprising amplifying an output of the oscillator prior to generating the respective pump pulse and seed pulse;
comprising generating the pump pulse and the seed pulse from respective synchronized oscillators;
wherein 1$\leq \tau_p \leq$100 ps;
comprising generating the seed pulse spectrum via super-continuum generation;
    wherein the seed pulse spectrum is a supercontinuum;
    wherein the seed pulse spectrum is a coherent supercontinuum;
wherein the chirped quasi phase-matched optical parametric amplifier/difference frequency generator (CQPM OPA/DFG) includes a plurality of serially disposed quasi phase matched non-linear media;
wherein the seed pulse spectrum has a frequency in the range from $\upsilon_p$ to $\upsilon_p/2$;
comprising using a dichroic mirror to collinearly combine the amplified pump pulse and the chirped, seed pulse spectrum;
wherein the pump pulse optical path and the seed pulse optical path comprise optical fiber media;
comprising providing a seed pulse spectrum from about 2 to about 4 micrometers (μm), wherein $\lambda_p$ is substantially 2 μm;
comprising providing a seed pulse spectrum from about 1 to about 2 μm, wherein $\lambda_p$ is substantially 1 μm;
comprising providing a seed pulse spectrum from about 540 to about 1060 nanometers (nm), wherein $\lambda_p$ is substantially 532 nm;
wherein non-mechanically adjusting the time delay between the pump pulse and the seed pulse comprises providing a non-mechanical, controllable time delay mechanism in at least one of the pump pulse optical path and the seed pulse optical path;
    wherein the non-mechanical, controllable time delay mechanism is a piezo-electric fiber stretcher;
    wherein the non-mechanical, controllable time delay mechanism is a phase and/or amplitude modulator;
comprising controllably scanning the amplified pump pulse over the chirped, seed pulse spectrum;
further comprising chirping the pump pulse;
    further comprising changing the relative delay and chirp of both the pump pulse and the seed pulse independently and with respect to the CQPM medium;
comprising generating the amplified pump pulse and the chirped, seed pulse spectrum using an all-fiber system;
further comprising characterizing the power at a particular output wavelength in terms of the timing between the pump and the seed and further determining a reference zero-delay point;
    further comprising varying the timing between the pump and the seed while monitoring the output power at multiple wavelengths to map the wavelength-to-time correlation across the full wavelength range;
        further comprising determining a time-wavelength calibration indicia of a manufactured system;
            further comprising adjusting the calibration indicia by repeatedly measuring the power at multiple wavelengths;
            further comprising temporally encoding the system, wherein a time code is linked to the variation of the timing between the pump and/or signal;
                further comprising using the time code to identify the output wavelength without direct measurement.

An embodiment of the invention is a laser system including at least one source from which a pump pulse having a pump pulse frequency, $\nu_{pump}$, and a seed pulse can be generated; a pump pulse amplifier optically coupled to the at least one source via a pump pulse optical path to receive the pump pulse and output an amplified pump pulse; a spectral broadening component and a chirping component optically coupled to the at least one source via a seed pulse optical path to receive the seed pulse and output a chirped, seed pulse spectrum having a frequency spanning between $\nu_{pump}$ and $\nu_{pump}/2$; a non-mechanical, controllable time delay component disposed in at least one of the pump pulse optical path and the seed pulse optical path adapted to provide a variable time delay between the pump pulse and the seed pulse; a optical combiner disposed to receive and combine the amplified pump pulse and the chirped, seed pulse along a common collinear optical path, wherein a total pump pulse optical path between the at least one source and the optical combiner, and a total seed pulse optical path between the at least one source and the optical combiner are substantially matched; a chirped quasi phase-matched optical parametric amplifier/difference frequency generator (CQPM OPA/DFG) including a CQPM non-linear medium having a length and a chirp rate disposed to receive the combined amplified pump pulse and chirped, seed pulse spectrum; and an optical path medium disposed between the optical combiner and the CQPM OPA/DFG. According to various exemplary, non-limiting embodiments, the apparatus may include the following additional components, features, limitations, and/or characteristics, alone or in combination:

wherein the at least one source is a Tm:fiber picosecond oscillator;

wherein the spectral broadening and chirping component is a supercontinuum generator adapted to output a chirped, seed pulse spectrum from about 2 μm to about 4 μm;

wherein the at least one source is adapted to output the pump pulse having a center wavelength of about 1 μm and a pulse duration, $\tau_p$, where $1 \leq \tau_p \leq 100$ ps;

wherein the spectral broadening and chirping component is a supercontinuum generator adapted to output a chirped, seed pulse spectrum from about 1 μm to about 2 μm;

wherein the pump pulse amplifier is an all-fiber amplifier;

wherein the non-mechanical, controllable time delay component is a fiber stretcher;

wherein the non-mechanical, controllable time delay mechanism is a phase and/or amplitude modulator;

wherein the fiber stretcher is a piezo-electric fiber stretcher;

wherein the CQPM non-linear medium is at least one of an orientation-patterned (OP)-GaAs, periodically poled lithium niobate (PPLN), periodically poled potassium Titanium Oxide Phosphate (PPKTP), periodically poled lithium tantalate (PPLT), OP-GaP, OP-GaN, and a CQPM media with imbedded waveguides including a PPLN waveguide;

wherein the optical path medium disposed between the optical combiner and the CQPM OPA/DFG is one of free-space and an optical waveguide;

wherein the optical waveguide is a hollow core fiber that delivers the combined pump and seed to the CQPM crystal;

further comprising a hollow core fiber to propagate the tunable output;

wherein an equivalent distance provided by the variable time delay component is at least as long as the length of the CQPM nonlinear medium;

wherein the at least one source comprises a respective pump pulse source and a respective seed pulse source, wherein the respective sources are synchronized.

It is to be appreciated that while the disclosed method and apparatus focuses on the generation of mid-IR light, other tunable wavelengths outside of the mid-IR spectrum are achievable based on the appropriate choices of drive laser and QPM nonlinear medium.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
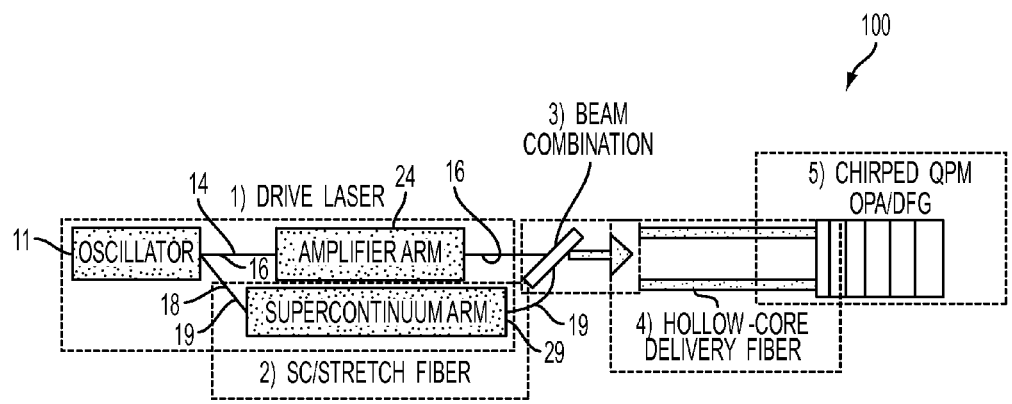
FIG. 1 schematically shows a laser system that enables a broadly tunable laser source with non-mechanical wavelength tunability, according to an exemplary embodiment of the invention.

FIG. 1 schematically shows an exemplary embodiment of a laser system 100 that enables a broadly tunable laser source with non-mechanical wavelength tunability. The basic components of the system include a drive laser 1 (dotted box), a non-mechanical time delay mechanism 2 (dotted box, and illustrated as but not limited to a SC/Stretch Fiber), a beam combiner component 3 (dotted box), a beam delivery medium 4 (dotted box, and illustrated as but not limited to a Hollow-core Fiber), and a chirped quasi phase-matched optical parametric amplifier/difference frequency generator (CQPM OPA/DFG) 5 (dotted box). In this configuration, a single oscillator as shown is used for the generation of "pump" and "seed" beams (pulsed) for input into the optical parametric amplifier (OPA) or a difference frequency generator (DFG; represented hereinafter as 'OPA/DFG'). In the particular aspect illustrated in FIG. 1, the non-mechanical time delay mechanism 2 is a piezo-electric fiber stretcher; the beam delivery medium 4 is a large mode area hollow-core fiber; and, the beam combiner component 3 is an integrated single dichroic mirror that transmits or reflects a pump beam and reflects or transmits a supercontinuum signal, and bulk collimation optics (not shown) for the pump and seed beams individually so that the two beams are combined along a collinear path, which would be assembled into a micro-optic unit with fiber inputs and outputs, effectively making it a fiber component. This illustrative laser system architecture makes it possible to achieve robust and compact system construction with substantially no free-space components.

The reader will clearly note that the disclosed invention will focus on apparatus and methods for the laser generation of mid-IR light; however, a person skilled in the art will understand that a similar system/method can be used to generate a wide range of tunable laser wavelengths based upon the choice of a proper drive laser and CQPM nonlinear medium (e.g., PPLN, PPKTP, OP-GaP).

Figure 6:
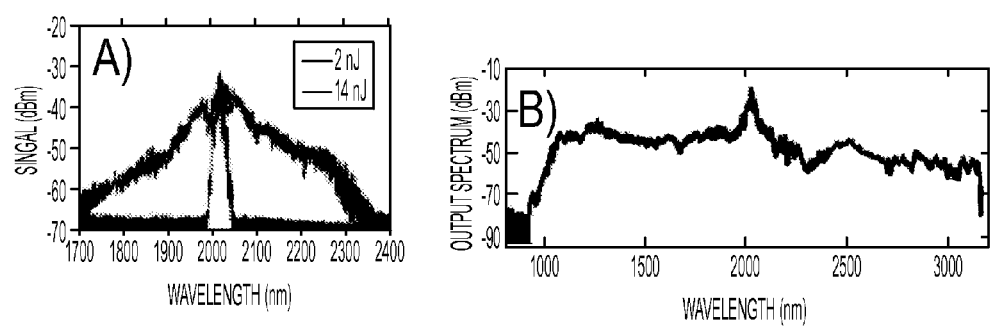
FIG. 6 shows supercontinuum generated via pumping with <10 kW peak power pulses from Tm:fiber CPA system in A) tellurite; and B) As S/Se fiber, according to illustrative aspects of the invention.

According to a non-limiting, illustrative aspect, the drive laser 1 includes a single oscillator 11 whose output is split into a pulsed pump beam 14 having a fixed wavelength, a center optical frequency, and a pulse duration ($\lambda_p, \upsilon_p, \tau_p$), that propagates along a pump pulse optical path 16 and a pulsed seed beam 18 having a wavelength, frequency, and pulse duration ($\lambda_x, \upsilon_s, \tau_s$), which propagates along a seed pulse optical path 19 to the beam combiner 3. The pump optical path further includes a pump pulse amplifier system 2 and the seed optical path includes a supercontinuum generation component 29 (see FIG. 6). The pump pulse amplifier system amplifies the pump pulses of frequency $\upsilon_p$ to a sufficient peak power, advantageously between about 1-100 kW. The supercontinuum generation component generates a supercontinuum seed spectrum with a frequency spanning between $\nu_{pump}$ and $\nu_{pump}/2$. The optical path/delay of both the pump pulse optical path and the seed pulse optical path are advantageously matched to assure pulse synchronization without the need to fully stabilize the phase of the oscillator. It is undesirable to seed with frequencies $<\nu_{pump}/2$ as this may be beyond the OPA/DFG degeneracy. Likewise it is undesirable to have seed frequencies $>\nu_{pump}$ as these may lead to two-photon (or higher) processes like two-photon absorption (TPA), second harmonic generation (SHG), sum frequency generation (SFG), etc.

Separate drive lasers in synchronization (not shown), in which one or both has a variable wavelength, could be used to serve as the pump and the seed, respectively, for OPA or DFG; however, in this case the overall output tuning range will be restricted by the effective wavelength tuning range of the drive lasers, whereas the supercontinuum-based seed spectrum can span a full octave.

A person skilled in the art will appreciate that all of the critical subcomponents of the system illustrated in FIG. 1 and their operating principles are known in the art, and they are not part of the invention per se. Likewise, the processes and apparatus for chirped quasi phase-matching (CQPM; e.g., the concept of using CQPM for SHG), optical parametric amplification (OPA), and optical parametric chirped pulse amplification (OPCPA) are known in the art and are not part of the invention per se. The assembly of such components into the embodied system architecture and their method of use as disclosed herein do, however, constitute novel and inventive subject matter.

Figure 2:
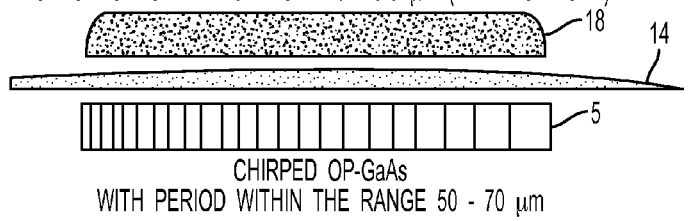
FIG. 2a schematically shows a chirped supercontinuum seed spectrum pulse spanning 2.0-3.9 μm (left to right) (top), a narrow linewidth pump pulse (center) having a temporal duration longer than that of the supercontinuum seed spectrum, and a chirped OP-GaAs non-linear medium having a chirp period from 50-70 μm (left to right) (bottom), as known in the art.
FIG. 2b shows a similar supercontinuum seed spectrum pulse spanning 2.0-3.9 μm (left to right) (top) and a chirped OP-GaAs non-linear medium having a chirp period from 50-70 μm (left to right) (bottom), and a narrow linewidth pump pulse (center) having a temporal duration much shorter than that of the supercontinuum seed spectrum, according to an illustrative aspect of the invention.
Figure 2:
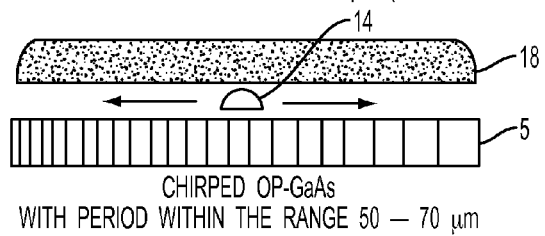

Key aspects of the embodied invention are the coordination of the timing between the pump and the seed pulses, and the chirp period of a quasi phase-matched (QPM) nonlinear medium. The width and timing of the pump pulse relative to the seed supercontinuum, in combination with the variation in phase matching along the length of the non-linear medium due to the chirped QPM period, determines the width and wavelength of the signal and idler to be amplified in the OPA or the output from DFG. According to the embodied invention, the chirped supercontinuum seed spectrum is matched to the chirp of the QPM OPA/DFG. Referring to FIG. 2a, if the pump pulse 14 is much longer than the seed supercontinuum 18, then entire phase-matched bandwidth will see gain, as well as generating a collinear idler (not shown) in the OPA. However, as illustrated in FIG. 2b (assuming proper overlap between the CQPM OPA/DFG and the chirped supercontinuum), if the pulse duration of the pump pulse 14 is much shorter than the length of the seed pulse 18, then changing the relative timing of the pump with respect to the seed (arrows) varies the location of the spatial/temporal overlap of the two pulses occurring within the CQPM nonlinear medium 5. As this overlap position determines the portion of the seed pulse that is phase-matched as the signal in the OPA or the seed for DFG, dithering the timing of the pump beam with respect to the supercontinuum enables tuning of the signal and idler output from the OPA or DFG. Advantageously, the use of a controllable, non-mechanical fiber stretcher 2 (or other appropriate non-mechanical delay mechanism/technique as known in the art; e.g., a phase and/or amplitude modulator) to adjust the relative timing of the pump with respect to the seed enables selective phase matching within the QPM without the use of any moving parts. Clearly the range of wavelength tunability, the width of the amplified signal/idler, and the relative efficiency of conversion will all be influenced by the relationships between the length and chirp rate of the CQPM OPA/DFG; the pulse duration, spectral width, and relative timing of the pump pulse, and spectral width/chirp of the supercontinuum seed.

Non-mechanical wavelength tuning thus lends itself to monolithic integration and robust packaging for demanding environments and applications, and further enables the precise knowledge of the wavelength(s) to be generated in terms of the timing between the pump and seed. Based upon the overall variation in path length between the pump and the seed, a reference "zero-delay" point will vary; however, this can be characterized dynamically. This could be accomplished, for example, by varying the timing between the pump and seed while monitoring the output power through a narrow-band filter. As such, the point at which the generated wavelength would transmit through the narrow-band filter would correspond to a particular overlap of pump and seed within the CQPM crystal. In addition to the zero-delay, upon characterization the relationship between the relative timing of the pump and seed can be mapped by monitoring the power at multiple wavelengths using several narrow linewidth notch filters. This timing between the pump/seed and the output wavelength relative to the zero-delay can be quite robust due to the integrated system design. As such, it should be sufficient to characterize the system after manufacturing and include a "time-wavelength calibration;" however in cases where extreme wavelength precision is critical this calibration could be adjusted by repeatedly measuring the power at multiple wavelengths using several narrow linewidth notch filters.

In addition, by modulating the repetition rate of the pump and/or the seed, it is possible to "encode" the signal in a similar way to methods utilized in telecommunication systems. As such, the temporal code (the "on/off" encoding) of the system can be linked to the variation of the timing between the pump and/or signal. Thus detecting the time code would provide a method for identifying the output wavelength without direct measurement (assuming the timing has been calibrated as discussed in the previous paragraph).

In the case of OPA/DFG across the mid-IR spectral band, the overall wavelength tuning range will be determined by the length and chirp rate of the CQPM material. The spectral width of the output will be determined by relative values and overlaps of the pulse duration/spectral width of the pump, the pulse duration/chirp of the seed, and the chirp rate of the CQPM nonlinear medium. It will be appreciated that both the pump and the seed may be separate, synchronized narrowband and wavelength tunable lasers. Alternatively, both the pump and the seed may be relatively broadband and chirped. Most advantageously, the pump will be narrowband (with or without some tunability) and not chirped, whereas the seed will be broadband and chirped.

Figure 3:
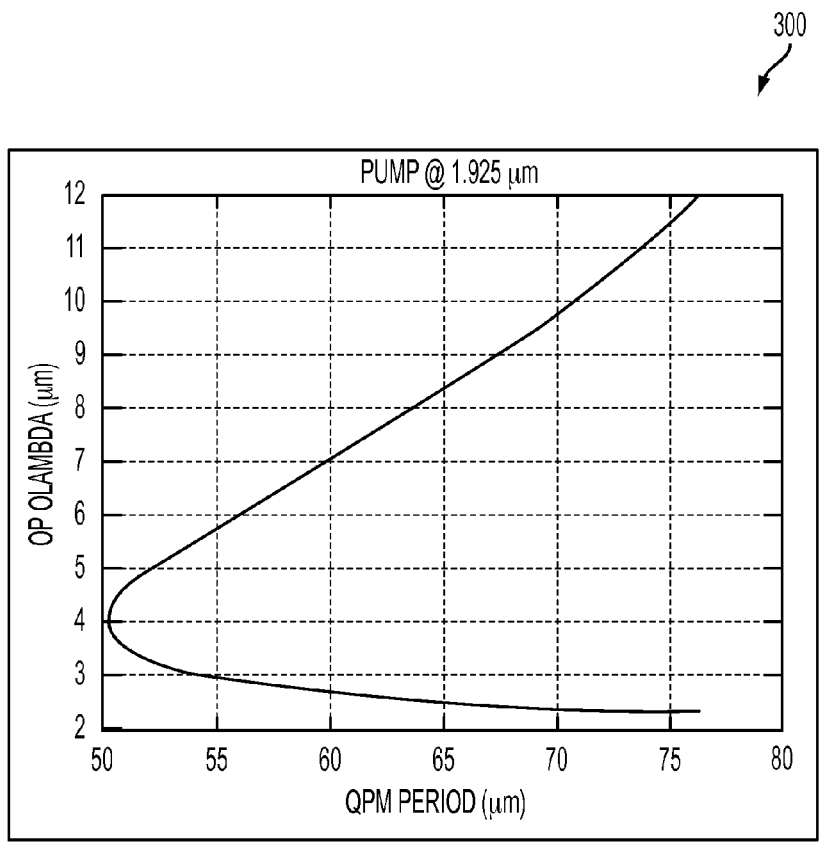
FIG. 3 shows a phase-matching curve (output wavelength vs. QPM period) for an OP-GaAs non-linear medium pumped at 1925 nm, according to an illustrative aspect of the invention.

FIG. 3 shows the phase matching curve 300 for an OP-GaAs OPA chip with a 4 cm length and linearly varying QPM period from $\Lambda1=50$ to $\Lambda2=76$ μm. In this case, the chirp gradient is:

$$B=2\pi(1/\Lambda1-1/\Lambda2)/L \quad \text{(Eqn. 1)}.$$

The only portion of the medium that contributes to amplification is centered on the point where the QPM condition ($\Delta k=0$) is satisfied. Assuming the chirp gradient in Eqn. 1, the phase $\Delta kz$ varies quadratically along the length of the medium. From this one can define a rough criterion for the effective interaction length $L_{eff}$, as the length where the phase changes by $\pi/2$ from the optimal spot ($z_0$) inside the medium such that:

$$L_{eff}=2(\pi/B2)^{1/2} \quad \text{Eqn. 2}.$$

The fact that only a portion of the nonlinear medium is "active" is critical to the single-pass power parametric gain G (assuming $\Delta k=0$) expressed as:

$$G=P_{in}/P_{out}=\cos h^2(\Gamma L) \quad \text{Eqn. 3}$$

where L is the length of a nonlinear medium and F is the gain increment given by:

$$\Gamma=(d^2_{eff}/n^3)(8\pi^2 I_{pump})/\lambda_1 \lambda_2 \epsilon_0 c) \quad \text{Eqn. 4}.$$

Case 1 (FIG. 2a) and Case 2 (FIG. 2b) can be even more generalized by assuming that the pump is also chirped. In such a case, the spatial/temporal distribution of the pump would also influence phase matching. For such a case, adjusting the relative chirps of the two pulses (e.g., using an acousto-optic programmable dispersion filter) in addition to the relative timing would provide even more potential for control of the wavelength and timing of the OPA output.

Although this concept assumes a non-stabilized oscillator (such that the pulses generated by the oscillator experience effectively the same optical delay for the pump and supercontinuum arms so that they can be synchronized within the OPA/DFG), this concept has additional potential when applied to a carrier envelope phase (CEP) stabilized oscillator. If the laser front-end produces a frequency comb such, this could be extended through supercontinuum generation and a tunable CQPM OPA/DFG could be made to selectively amplify specific comb lines. The comb spacing and the amplification bandwidth of the CQPM OPA/DFG will determine the number of frequency comb lines amplified. In order to amplify individual comb lines, it would therefore be useful to have large comb spacing and a very gradual QPM period chirp.

Two illustrative embodiments will now be described in which a high peak power pump and a broad spectrally chirped seed are collinearly incident on an OPA or DFG medium with a chirped QPM period. The QPM period is chosen to vary so that the phase matching condition varies along the length of the medium such that the broad spectral band of the seed spectrum can be amplified at different locations along the medium despite the fixed wavelength of the pump pulse.

EXAMPLE 1

Figure 4:
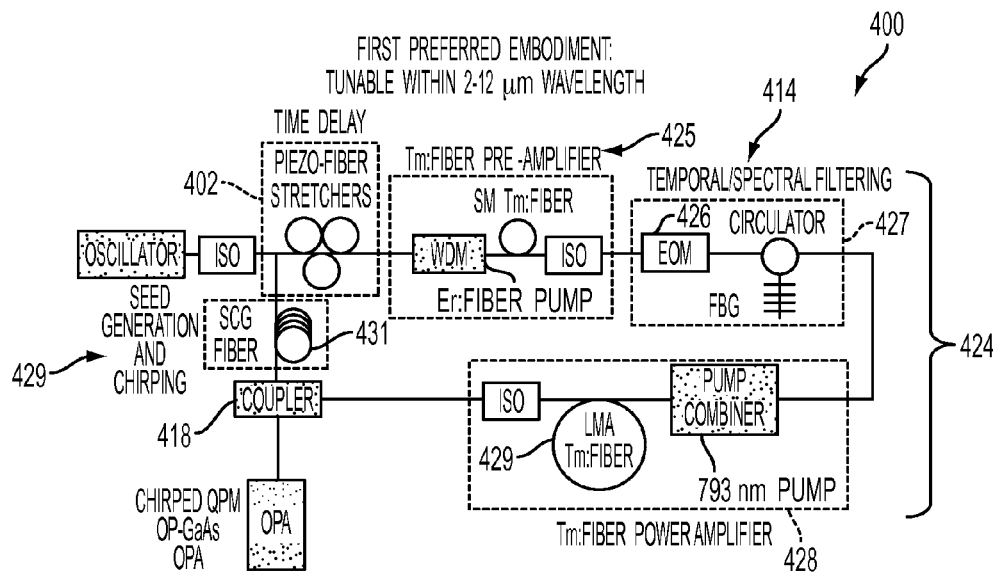
FIG. 4 is a more detailed version of FIG. 1 and schematically shows the optical layout of a drive laser subsystem (including pump amplifier arm and supercontinuum seed spectrum arm) of a tunable wavelength system supporting a method for tunable output over the range from 2-12 μm, according to an exemplary embodiment of the invention.

FIG. 4 is a more detailed version of FIG. 1 and schematically shows the optical layout of the drive laser subsystem 400 (including pump amplifier arm 424 and supercontinuum seed spectrum arm 429) of a tunable wavelength system supporting a method for tunable output over the range from 2-12 μm (e.g., the pump is at ~2 um and the seed spans ~2-4 um. Thus, the signal output of the OPA would amplify the seed (from 2-4 um) and would generate a corresponding idler that would have output from ~4-12 um), which enables both power and wavelength performance that is currently not achievable with existing technology.

In the drive laser, piezo-fiber stretchers 402 provide the variable time delay between the pump and seed arms 414, 418, respectively. Such variable temporal delay can be imposed in the pump or seed (or both) arm. Typical piezoelectric fiber stretchers provide variable delays up to the equivalent of ~3 mm. As such, it would be necessary to implement ~10 such units in series in order to provide sufficient variable delay to be able to traverse the length of a ~3 cm long CQPM nonlinear medium. As it will be necessary to introduce offset delay in the seed arm to balance the additional fiber included in the piezo electric fiber stretchers, additional fiber 431 will be required before supercontinuum generation and chirping.

The drive laser is a Tm:fiber picosecond oscillator in which a portion of the oscillator pulse (before or after amplification depending on the required power/energy of the system/process) is split off and used to generate a supercontinuum signal spanning ~2-4 μm (or therein) in a fiber (e.g., consider chalcogenide, ZBLAN) while the majority of the oscillator output is amplified to high peak power. The supercontinuum signal will be naturally chirped due to the dispersion of the fiber, and it is possible to stretch this chirped pulse duration using an appropriate length of fiber.

In the pump arm 414, a narrow linewidth (which may but need not be time-bandwidth limited) picosecond pulse ($1 \leq \tau_p \leq 100$ ps) is amplified in fibers with increasing core diameter in order to sustain the increasing peak powers. In this illustration, a single-mode (SM) Tm:fiber pre-amplifier 425 is core-pumped in order to minimize overall fiber length. Between amplifier stages, it may be necessary to reduce the pulse repetition rate by, e.g., using a fiber-coupled electro-optic modulator 426, although this could also be accomplished using acousto-optic modulators, or combinations of EOMs and AOMs (not shown). Between amplifier stages, it may also be advantageous to filter (427) the wavelength in order to avoid amplified stimulated emission and/or to minimize spectral broadening during amplification. The final amplification stage 428 will advantageously utilize a large mode area fiber 429 in order to achieve as high peak power as possible while avoiding/minimizing nonlinear effects and maintaining nearly diffraction-limited beam quality.

A relatively simple oscillator as disclosed in R. A. Sims, P. Kadwani, H. Ebendorff-Heideprem, L. Shah, T. M. Monro, M. Richardson, "Chirped pulse amplification in single mode Tm:fiber using a chirped Bragg grating" Appl. Phys. B. DOI 10.1007/s00340-013-5333-5 (2013) and R. A. Sims, P. Kadwani, A. Sincore, L. Shah, M. Richardson, "1 μJ, sub-500 fs chirped pulse amplification in a Tm-doped fiber system" Optics Letters 38, 121-123 (2013), could be used to drive supercontinuum generation (SCG). The ultrashort pulse duration and peak power prior to pulse stretching offers several advantages in terms of SCG. In one configuration, the amplifier arm would use a narrowband spectral filter so as to amplify a quasi transform-limited pulse with 10-100 ps pulse duration. Alternatively, an oscillator similar to that disclosed in Liu, Q. Wang, P. Wang, "High average power picosecond pulse generation from a thulium-doped all-fiber MOPA system," Optics Express 20, 22442-22447 (2012), in which a portion of the output is directly amplified in the amplifier arm and the rest of the output used for supercontinuum generation (SCG) may be used.

For mid-IR generation from a Tm:fiber drive laser, a QPM nonlinear material such as PPLN, PPKTP, PPLT, or (orientation-patterned) OP-GaP, OP-GaN, or (OP)-GaAs substrate, as well as chirped QPM media with imbedded waveguides (such as PPLN waveguides), may be suitable.

The width and timing of the pump pulse relative to the seed supercontinuum, in combination with the variation in phase matching along the length of the medium due to the chirped QPM period, will determine the width and wavelength of the signal and idler to be amplified in the OPA or the output from DFG.

EXAMPLE 2

Figure 5:
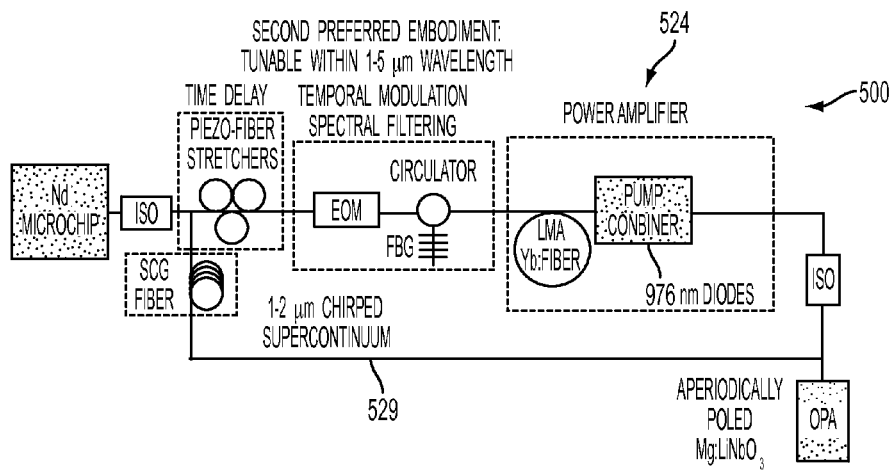
FIG. 5 is a more detailed version of FIG. 1 and schematically shows the optical layout of a drive laser subsystem (including pump amplifier arm and supercontinuum seed spectrum arm) of a tunable wavelength system supporting a method for pumping at 1 μm and providing tunable output over the range from 1-5 μm, according to an exemplary embodiment of the invention.

FIG. 5 is a more detailed version of FIG. 1 and schematically shows the optical layout of the drive laser subsystem 500 (including pump amplifier arm 524 and supercontinuum seed spectrum arm 529) of a tunable wavelength system supporting a method for tunable output over the range from 1-5 μm (e.g., the pump is at 1 um and the seed spans ~1-2 μm. Thus, the signal output of the OPA would amplify the seed (from 1-2 μm) and would generate a corresponding idler that would have output from ~2-5 μm, where the ~5 μm limit is imposed by the transparency limit of the QPM crystal, e.g., PPLN).

The illustrated system makes use of commercial off-the-shelf products and offers potentially superior performance particularly in terms of size and robustness over, e.g., Northrop Grumman's VIPER system. One potentially interesting drive laser for pumping at 1 μm, and in parallel generating a supercontinuum from 1-2 μm to seed the OPA, is described in A. Steinmetz, F. Jansen, F. Stutzki, R. Lehneis, J. Limpert, A. Tünnermann, "Sub-5-ps, multimegawatt peak-power pulses from a fiber-amplified and optically compressed passively Q-switched microchip laser," Optics Letters 37, 2550-2552 (2012).

A system as described in R. Bhandari, T. Taira, ">6 MW peak power at 532 nm from passively Q-switched Nd:YAG/Cr4+:YAG microchip laser," Optics Express 19, 19135-19141 (2011) could be used to pump an OPA at 532 nm, and generate a supercontinuum tunable from ~540-1060 nm to seed the OPA.

As introduced in Sims et al. id., we have initiated experiments in supercontinuum generation using tellurite fibers. These results are summarized in FIG. 6, and form a robust foundation from which to develop near nonlinear glass fibers. Others have recently demonstrated novel fabrication techniques critical to chalcogenide fibers (G. Tao, S. Shabahang, E.-H. Banaei, J. J. Kaufan, A. F. Aboraddy, "Multimaterial preform coextrusion for robust chalcogenide optical fibers and tapers," Optics Letters 37, 2751-2753 (2012)). The promise of soft-glass fibers for mid-IR supercontinuum generation is recently summarized in I. Savelli, O. Mouawad, J. Fatome, B. Libler, F. Desevedavy, G. Gadret, J.-C. Jules, P.-Y. Bony, H. Kawashima, W. Gao, T. Kohoutek, T. Suzuki, Y. Onishi, F. Smektala, "Mid-infrared 2000-nm bandwidth supercontinuum generation in suspended-core microstructured Sulfide and Tellurite optics fibers," Optics Express 20, 27083-27093 (2012) and A. Marandi, C. W. Rudy, V. G. Plotnichenko, E. M. Dianov, K. L. Vodopyanov, R. L. Byer, "Mid-infrared supercontinuum generation in tapered chalcogenide fiber for producing octave-spanning frequency comb around 3 μm," Optics Express 20, 24218-24225 (2012). Ideally, this supercontinuum should be coherent and should exit the SGC stage with a smooth chirp and sufficient spectral brightness for OPA or DFG seeding. Further development is required to generate an optimized supercontinuum (spectral width and brightness) and dispersion fiber for pulse chirping in the mid-IR; however, this concept can also be implemented in the near-IR (as well as visible) where a range of appropriate supercontinuum and pump lasers are commercially available. Furthermore, the potential of this concept (in terms of wavelength coverage and conversion efficiency) can be proven using a range of non-ideal seed sources such as those shown in FIG. 6 or the incoherent supercontinuum generated using nanosecond pulses from a Tm:fiber Q-switched oscillator as described in P. Kadwani, N. Modsching, R. A. Sims, L. Leick, J. Broeng, L. Shah, M. Richardson, "Q-switched thulium-doped photonic crystal fiber laser," Optics Letters 37, 1664-1666 (2012).

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or"

as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A method for tunable wavelength selection in a broadband laser output, comprising:
    generating a pump pulse having a fixed wavelength, a center optical frequency, and a pulse duration ($\lambda_p$, $\upsilon_p$, $\tau_p$) and propagating the pump pulse along a pump pulse optical path;
    generating a seed pulse having a wavelength, frequency, and pulse duration ($\lambda_s$, $\upsilon_s$, $\tau_s$) and propagating the seed pulse along a seed pulse optical path, wherein $\tau_p \ll \tau_s$;
    amplifying the pump pulse to a sufficient peak power;
    spectrally broadening and chirping the seed pulse to generate a chirped, seed pulse spectrum;
    collinearly combining the amplified pump pulse and the chirped, seed pulse spectrum, wherein the pump pulse optical path and the seed pulse optical path are matched up to the point of combination;
    inputting the collinearly combined amplified pump pulse and the chirped, seed pulse spectrum into a chirped quasi phase-matched optical parametric amplifier/difference frequency generator (CQPM OPA/DFG) including a CQPM non-linear medium having a length and a chirp period, wherein the chirped, seed pulse spectrum is substantially matched to the length and the chirp period of the CQPM non-linear medium; and
    non-mechanically adjusting a time delay between the pump pulse and the seed pulse to select a particular phase-matched spectral bandwidth overlap region between the amplified pump pulse and the chirped, seed pulse spectrum in the CQPM non-linear medium, thus providing a discrete, tunable output wavelength over the seed pulse spectrum.

2. The method of claim 1, wherein 1 ps≤$\tau_p$≤100 ps and 100 ps≤$\tau_s$≤1 ns.

3. The method of claim 1, further comprising amplifying the pump pulse to a peak power between 1-100 kW.

4. The method of claim 1, comprising generating the pump pulse and the seed pulse from a single oscillator.

5. The method of claim 4, comprising amplifying an output of the oscillator prior to generating the respective pump pulse and seed pulse.

6. The method of claim 1, comprising generating the pump pulse and the seed pulse from respective synchronized oscillators.

7. The method of claim 1, wherein 1≤$\tau_p$≤100 ps.

8. The method of claim 1, comprising generating the seed pulse spectrum via supercontinuum generation.

9. The method of claim 8, wherein the seed pulse spectrum is a coherent supercontinuum.

10. The method of claim 1, wherein the chirped quasi phase-matched optical parametric amplifier/difference frequency generator (CQPM OPA/DFG) includes a plurality of serially disposed QPM non-linear media.

11. The method of claim 1, wherein the seed pulse spectrum has a frequency in the range from $\upsilon_p$ to $\upsilon_p/2$.

12. The method of claim 1, comprising using a dichroic mirror to collinearly combine the amplified pump pulse and the chirped, seed pulse spectrum.

13. The method of claim 1, wherein the pump pulse optical path and the seed pulse optical path comprise optical fiber media.

14. The method of claim 1, comprising providing a seed pulse spectrum from about 2 to about 4 micrometers (μm), wherein $\lambda_p$ is substantially 2 μm.

15. The method of claim 1, comprising providing a seed pulse spectrum from about 1 to about 2 μm, wherein $\lambda_p$ is substantially 1 μm.

16. The method of claim 1, comprising providing a seed pulse spectrum from about 540 to about 1060 nanometers (nm), wherein $\lambda_p$ is substantially 532 nm.

17. The method of claim 1, wherein non-mechanically adjusting the time delay between the pump pulse and the seed pulse comprises providing a non-mechanical, controllable time delay mechanism in at least one of the pump pulse optical path and the seed pulse optical path.

18. The method of claim 17, wherein the non-mechanical, controllable time delay mechanism is a piezo-electric fiber stretcher.

19. The method of claim 17, wherein the non-mechanical, controllable time delay mechanism is a phase and/or amplitude modulator.

20. The method of claim 1, comprising controllably scanning the amplified pump pulse over the chirped, seed pulse spectrum.

21. The method of claim 1, further comprising chirping the pump pulse.

22. The method of claim 21, further comprising changing the relative delay and chirp of both the pump pulse and the seed pulse independently and with respect to the CQPM medium.

23. The method of claim 1, comprising generating the amplified pump pulse and the chirped, seed pulse spectrum using an all-fiber system.

24. The method of claim 1, further comprising characterizing the power at a particular output wavelength in terms of the timing between the pump and the seed and further determining a reference zero-delay point.

25. The method of claim 24, further comprising varying the timing between the pump and the seed while monitoring the output power at multiple wavelengths to map the wavelength-to-time correlation across the full wavelength range.

26. The method of claim 25, further comprising determining a time-wavelength calibration indicia of a manufactured system.

27. The method of claim 26, further comprising adjusting the calibration indicia by repeatedly measuring the power at multiple wavelengths.

28. The method of claim 26, further comprising temporally encoding the system, wherein a time code is linked to the variation of the timing between the pump and/or signal.

29. The method of claim 26, further comprising using the time code to identify the output wavelength without direct measurement.

30. A laser system, comprising:
    at least one source from which a pump pulse having a pump pulse frequency, $v_{pump}$, and a seed pulse can be generated;
    a pump pulse amplifier optically coupled to the at least one source via a pump pulse optical path to receive the pump pulse and output an amplified pump pulse;
    a spectral broadening component and a chirping component optically coupled to the at least one source via a seed pulse optical path to receive the seed pulse and output a chirped, seed pulse spectrum having a frequency spanning between $v_{pump}$ and $v_{pump}/2$;
    a non-mechanical, controllable time delay component disposed in at least one of the pump pulse optical path and the seed pulse optical path adapted to provide a variable time delay between the pump pulse and the seed pulse;
    a optical combiner disposed to receive and combine the amplified pump pulse and the chirped, seed pulse along a common collinear optical path, wherein a total pump pulse optical path between the at least one source and the optical combiner, and a total seed pulse optical path between the at least one source and the optical combiner are substantially matched;
    a chirped quasi phase-matched optical parametric amplifier/difference frequency generator (CQPM OPA/DFG) including a CQPM non-linear medium having a length and a chirp rate disposed to receive the combined amplified pump pulse and chirped, seed pulse spectrum; and
    an optical path medium disposed between the optical combiner and the CQPM OPA/DFG.

31. The laser system of claim 30, wherein the at least one source is a Tm:fiber picosecond oscillator.

32. The laser system of claim 31, wherein the spectral broadening and chirping component is a supercontinuum generator adapted to output a chirped, seed pulse spectrum from about 2 μm to about 4 μm.

33. The laser system of claim 31, wherein the pump pulse amplifier is an all-fiber amplifier.

34. The laser system of claim 30, wherein the at least one source is adapted to output the pump pulse having a center wavelength of about 1 μm and a pulse duration, $\tau_p$, where $1 \leq \tau_p \leq 100$ ps.

35. The laser system of claim 34, wherein the spectral broadening and chirping component is a supercontinuum generator adapted to output a chirped, seed pulse spectrum from about 1 μm to about 2 μm.

36. The laser system of claim 30, wherein the non-mechanical, controllable time delay component is a fiber stretcher.

37. The laser system of claim 36, wherein the fiber stretcher is a piezo-electric fiber stretcher.

38. The laser system of claim 30, wherein the non-mechanical, controllable time delay mechanism is a phase and/or amplitude modulator.

39. The laser system of claim 30, wherein the CQPM non-linear medium is at least one of an orientation-patterned (OP)-GaAs, periodically poled lithium niobate (PPLN), periodically poled potassium Titanium Oxide Phosphate (PP-KTP), periodically poled lithium tantalate (PPLT), OP-GaP, OP-GaN, and a CQPM media with imbedded waveguides including a PPLN waveguide.

40. The laser system of claim 30, wherein the optical path medium disposed between the optical combiner and the CQPM OPA/DFG is one of free-space and an optical waveguide.

41. The laser system of claim 40, wherein the optical waveguide is a hollow core fiber that delivers the combined pump and seed to the CQPM crystal.

42. The laser system of claim 40, further comprising a hollow core fiber to propagate the tunable output.

43. The laser system of claim 30, wherein an equivalent distance provided by the variable time delay component is at least as long as the length of the CQPM nonlinear medium.

44. The laser system of claim 30, wherein the at least one source comprises a respective pump pulse source and a respective seed pulse source, wherein the respective sources are synchronized.

* * * * *

UNITED STATES PATENT AND TRADEMARK OFFICE
CERTIFICATE OF CORRECTION

| | | |
|---|---|---|
| PATENT NO. | : 8,896,912 B2 | Page 1 of 1 |
| APPLICATION NO. | : 14/199452 | |
| DATED | : November 25, 2014 | |
| INVENTOR(S) | : Lawrence Shah et al. | |

It is certified that error appears in the above-identified patent and that said Letters Patent is hereby corrected as shown below:

In the Specification

Column 1, line 18, after "N000141210144" insert --and the United States Air Force (USAF) under contract No. FA945110D0234--.

Signed and Sealed this
Twenty-fourth Day of November, 2015

Michelle K. Lee
*Director of the United States Patent and Trademark Office*